July 20, 1948.   E. E. HOWE   2,445,578
JOINT FOR TUBES
Filed Jan. 1, 1945
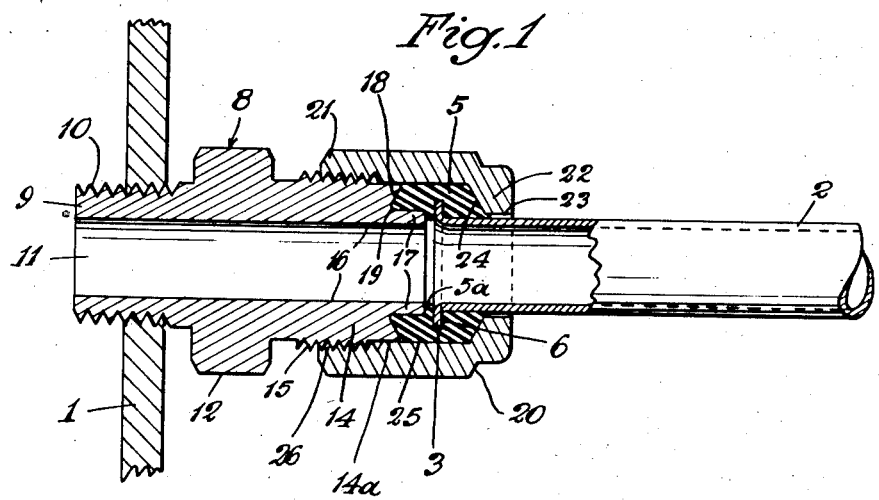
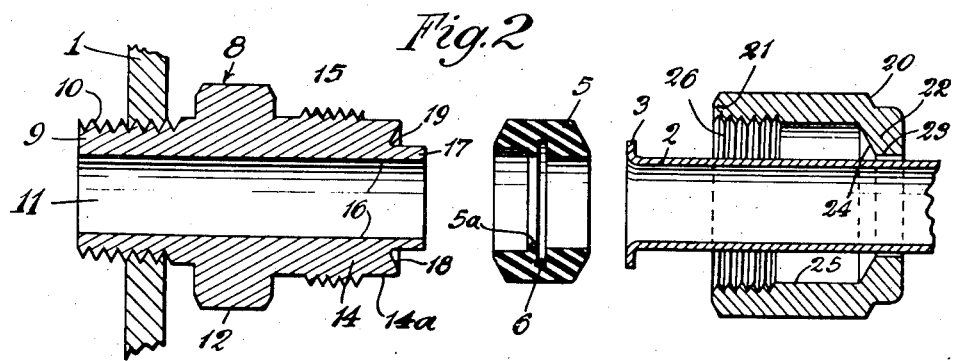
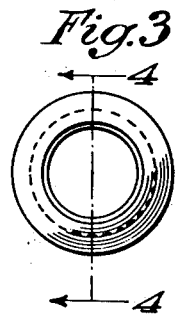
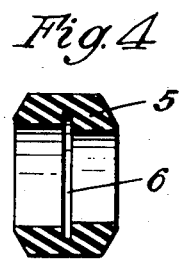
Inventor
Earl E. Howe
by Parker & Carter
Attorneys.

Patented July 20, 1948

2,445,578

UNITED STATES PATENT OFFICE 2,445,578

JOINT FOR TUBES

Earl E. Howe, Chicago, Ill., assignor, by mesne assignments, to Chicago Forging and Manufacturing Company, Chicago, Ill., a corporation of Delaware Application January 1, 1945, Serial No. 570,891

3 Claims. (Cl. 285—90)

My invention relates to an improvement in joints or connections for tubing. It has for one purpose to provide a joint which is leakproof at all ordinary pressures and temperatures and is adapted to stand up under exceedingly high pressures.

Another purpose is to provide a joint which can be readily applied, removed and reapplied in the field.

Another purpose is to provide a joint of maximum simplicity.

Another purpose is to provide a joint in which metal to metal contact between the parts joined is avoided.

Other purposes will appear from time to time throughout the course of the specification and claims. My invention is illustrated in the accompanying drawings wherein:

Figure 1 illustrates a joint or connection in axial section, with the joint completed;

Figure 2 illustrates the parts of Figure 1 disassembled;

Figure 3 is an end elevation of a variant form of rubber gasket; and

Figure 4 is a section on the line 4—4 of Fig. 3.

Like parts are indicated by like characters throughout the specification and drawings.

Referring to the drawings, I indicates any suitable base or member to which the joint may be secured. It will be understood that the joint need not necessarily be employed with a fixed base but one of the advantages of the joint is its ready applicability and removal from a fixed base as will later appear in greater detail. 2 indicates a tube which may for example be a thin metallic tube and which may be secured by the below described joint to the base or the member 1. 3 indicates an outwardly extending projection at the end of the tube. In the particular embodiment of the invention herein shown, the projection 3 is illustrated as a flange at the end of the tube 2, lying for the most part, in a plane generally perpendicular to the axis of the tube 2. Surrounding the flange 3, I illustrate a mass of compressible material 5, which may for example be of rubber or any suitable rubber substitute. It may have, if desired, an inner circumferential channel 6 adapted to receive the flange 3. Since the member 5 is flexible, it may readily be applied and removed in the field. It may for example be removed when somewhat worn and be replaced by a similar mass or member.

The joint proper includes a passage or housing member 8 which has a reduced end 9, externally screw threaded at 10 for attachment within a screw threaded aperture in the member 1. 11 is an axially extending passage which may be of the general cross sectional area of the passage defined by the tube 2. 12 is any suitable nut portion which may be formed hexagonally in cross section or otherwise formed to permit its engagement by a tool whereby the member 8 may be rotated into or out of locking engagement with the member 1. The member 8 terminates at its outer end in an enlarged portion 14 which has an exterior screw thread 15 and an inner generally cylindrical face 16. The portion 14 is shown as terminating in its end with a circumferential outer seat including an outwardly cylindrical portion 17 and an outwardly extending face 18, which is undercut as at 19.

In forming a joint, a mating housing member generally indicated as 20 is threaded on the tube 2. It has an open end 21 and a closed end 22. The closed end is apertured as at 23, the diameter of the aperture being greater than the outside diameter of the tube 2, which pass therethrough. The interior defined by the member 20 has at its closed end a conic or beveled surface 24 corresponding to the undercut surface 18 but oppositely inclined in relation to the axis of the tube. The member 20 also has an inner generally cylindrical surface 25 which conforms generally in diameter to the unscrew threaded outside portion 14a of the member 8. The member 20 is also provided with an internal screw thread 26 mating with the external screw thread 15 of the element 8.

In assembling the joint, the end of the tube 2 is moved into the position in which it is shown in Figure 1. The member 20 is then screwed into the position in which it is shown in Figure 1 by any appropriate tool. It will be understood that the exterior of the member 20 may be formed to permit a holding engagement with any suitable tool employed to rotate it in relation to the fitting 8. It is rotated until the washer or compressible mass 5 substantially fills the space or chamber defined by the surfaces 18, 24 and 25, and the exterior of the tube 2. It will be observed that the washer 5 prevents any metal to metal contact between the tube 2 and any part of the members 8 and 20. It will also be observed that the clearance between the exterior of the tube 2 and the wall defining the aperture 23 is sufficient to permit a compressible flexure of the tube 2 in relation to the axis of the aperture 11 in the fitting 8.

Assume that the above described joint is employed to secure a more or less flexible metallic tube to a piece of machinery located within a restricted area such as the interior of a tank. In breaking and repacking of the joint, it is important that the endwise movement of the tube 2 be as small as possible. The joint can be broken by merely rotating the member 20 in retrograde direction to free the threads 26 from the threads 15 of the member 8. The member 20 can then be slid along the length of the tube 2. When the tube 2 is in the position shown the gasket 5 is only slightly about the end of the flanges 17. Therefore a very slight withdrawal of the tube 2 is sufficient to clear it from the member 8, and put it out of alignment with the member 14, for ready removal of the washer 5 and its substitution by a new flexible washer.

I thus provide a simple, efficient joint which can be applied readily in restricted areas and which can be broken and replaced in restricted areas with a minimum of disturbance of the tube associated with the joint.

It will be realized that while I have shown and described an operative device, still many changes in the size, shape, number and disposition of parts may be made without departing materially from the spirit of my invention. I wish, therefore, that my showing be taken as in a large sense as diagrammatic.

For example, whereas in Figure 2, I illustrate a flexible ring 5 with a preformed bead 5a, in Figure 4, I illustrate a similar ring in which the preformed bead 5a is omitted and in which I rely on the compression of the parts to cause the material to flow slightly into or toward the position in which 5a is shown in Figure 1.

The use and operation of my invention are as follows:

It will be observed from the drawing that when the members 8 and 20 are in closed or locked position in which they are shown, the space within them and about the end of the tube 2 is entirely filled by the flexible washer 5. Preferably the washer 5 is pre-formed substantially to the bottom in which it is shown in the drawing and is provided with a pre-formed inner circumferential slot 6 to receive the end flange 3 of the tube 2. When the part 20 is screwed into position in relation to the part 14, the washer 5 completely fills the space between the parts and may extend, if desired, slightly inwardly along the end face of the flange 3. Since the member 5 is formed of relatively stiff material and is pre-formed to proper shape, there is little if any distortion and no tendency on the part of the material to flow inwardly into the interior of the tube or of the passage or space 16. However, the slight inward projection, as at 5a, is permissible and even desirable, and serves to bridge the gap between the outer face of the flange 3 and the opposed portion of the member 14. It will thus be seen that there is no metal to metal contact between the tube 2 and the member 20 or between the tube 2 and the member 14. Endwise movement of the tube 2 is prevented by the positioning of the flange 3 in the slot 6. The clearance of the aperture 23 from the exterior of the tube 2 is such as to permit some degree of flexure of the tube 2 in relation to the joint or fitting. The gap between the members 3 and 17 is sufficient to prevent a metal to metal contact but insufficient to permit any substantial inward passage of the material of the washer 5. In any event, it is desirable to use a washer of sufficiently firm material to prevent any substantial distortion thereof or any tendency of the material to flow inwardly into the passage of the joint.

I claim:

1. In a joint, a tube having an outwardly extending flange at its end, a preformed washer of flexible material surrounding the edge of the tube and provided with a central bore and a channel in said bore adapted to receive said flange and engage both sides thereof, said washer extending endwise beyond the ends of the tube, and a fitting including interpenetrating portions adapted to form, with the exterior end of the tube, a pressure chamber, the washer filling said pressure chamber when the members are in locked position, the bore, at opposite sides of said channel, being of unequal diameters, one portion of said fitting having a tubular extension extending into and surrounded by that part of the bore which is of larger diameter, the inner face of said bore having a circumferential enlargement extending inwardly between said channel and the adjacent end of said fitting portion, adapted to serve as a yielding separation between the fitting portion and the end of the tube, whereby a metal to metal contact is prevented.

2. In a joint, a tube having an outwardly extending flange at its end, conforming generally to a plane perpendicular to the extension of the tube, a preformed flexible washer surrounding the end of the tube and channeled internally to receive said flange, and extending endwise beyond the end of the tube, and a fitting including interpenetrating portions adapted to form, with the exterior of the end of the tube, a pressure chamber, the washer completely filling said pressure chamber when said members are in locked position, one of said interpenetrating portions having a projection adapted to form an inner wall about the part of the pressure chamber which is located beyond the end of the tube, said washer having a portion inwardly extending between the end of said projection and the end of the tube.

3. In a joint, a tube having an outwardly extending flange at its end, a preformed flexible washer surrounding the end of the tube and channeled internally to receive said flange, and extending endwise beyond the end of the tube, and a fitting including interpenetrating portions adapted to form, with the exterior of the end of the tube, a pressure chamber, the washer completely filling said pressure chamber when said members are in locked position, one of said interpenetrating portions having a projection adapted to form an inner wall about the part of the pressure chamber which is located beyond the end of the tube, said washer having a portion inwardly extending between the end of said projection and the end of the tube.

EARL E. HOWE.

REFERENCES CITED

The following references are of record in the file of this patent:

UNITED STATES PATENTS

| Number | Name | Date |
| --- | --- | --- |
| 2,035,978 | Parker | Mar. 31, 1936 |
| 2,301,280 | Howe | Nov. 10, 1942 |
| 2,394,351 | Wurzburger | Feb. 5, 1946 |